(12) United States Patent
Su et al.

(10) Patent No.: US 9,377,045 B2
(45) Date of Patent: Jun. 28, 2016

(54) WOOD SCREW

(71) Applicant: TAIWAN SHAN YIN INTERNATIONAL CO., LTD., Kaohsiung (TW)

(72) Inventors: Kou-Tsair Su, Kaohsiung (TW); Yu-Jung Su, Kaohsiung (TW)

(73) Assignee: Taiwan Shan Yin Int'l Co., Ltd., Kaohsiung (TW)

( * ) Notice: Subject to any disclaimer, the term of this patent is extended or adjusted under 35 U.S.C. 154(b) by 0 days.

(21) Appl. No.: 14/640,355

(22) Filed: Mar. 6, 2015

(65) Prior Publication Data

US 2015/0184685 A1 Jul. 2, 2015

Related U.S. Application Data

(63) Continuation-in-part of application No. 13/726,936, filed on Dec. 26, 2012, now abandoned.

(51) Int. Cl.
*F16B 35/06* (2006.01)
*F16B 25/10* (2006.01)
*F16B 25/00* (2006.01)

(52) U.S. Cl.
CPC ............ *F16B 25/103* (2013.01); *F16B 25/0015* (2013.01); *F16B 35/065* (2013.01); *F16B 25/0057* (2013.01)

(58) Field of Classification Search
CPC ..................................................... F16B 35/065
USPC ......................................................... 411/399
See application file for complete search history.

(56) References Cited

U.S. PATENT DOCUMENTS

| 29,963 | A | * | 9/1860 | Freeman | F16B 35/06 411/399 |
| 378,614 | A | * | 2/1888 | Palmer | F16B 35/06 411/399 |
| 470,804 | A | * | 3/1892 | Jones | F16B 4/004 411/424 |
| 1,238,636 | A | * | 8/1917 | Christofferson | F16B 35/06 411/399 |
| 2,147,209 | A | * | 2/1939 | Olson | F16B 39/282 411/187 |
| 3,903,784 | A | * | 9/1975 | Dekker | F16B 35/065 411/399 |
| 6,302,631 | B1 | * | 10/2001 | Takasaki | F16B 35/065 411/399 |
| 6,616,391 | B1 | * | 9/2003 | Druschel | F16B 25/0015 411/187 |

* cited by examiner

*Primary Examiner* — Flemming Saether
(74) *Attorney, Agent, or Firm* — Rosenberg, Klein & Lee

(57) ABSTRACT

A wood screw includes a plurality of cutting areas radially disposed on a conical bottom surface of a head and a smooth area formed between the cutting areas. Each cutting area has at least two grooves, each of which has a base different from each smooth area and two rib walls protruding from the base. The rib walls of two adjacent grooves meet to form a first cutting edge. Each cutting area further has two outer walls protruding from the smooth area. Each outer wall meets one rib wall of the adjacent groove on a second cutting edge. The cutting edges cut and scrape off burrs attached to a drilled hole. The cutting edges cooperate with the grooves to permit a continuous cutting action simultaneously with an increasing accommodation area for scraped burrs and prevent the burrs from sticking out from the head. Thus, the fastening effect is promoted.

3 Claims, 5 Drawing Sheets

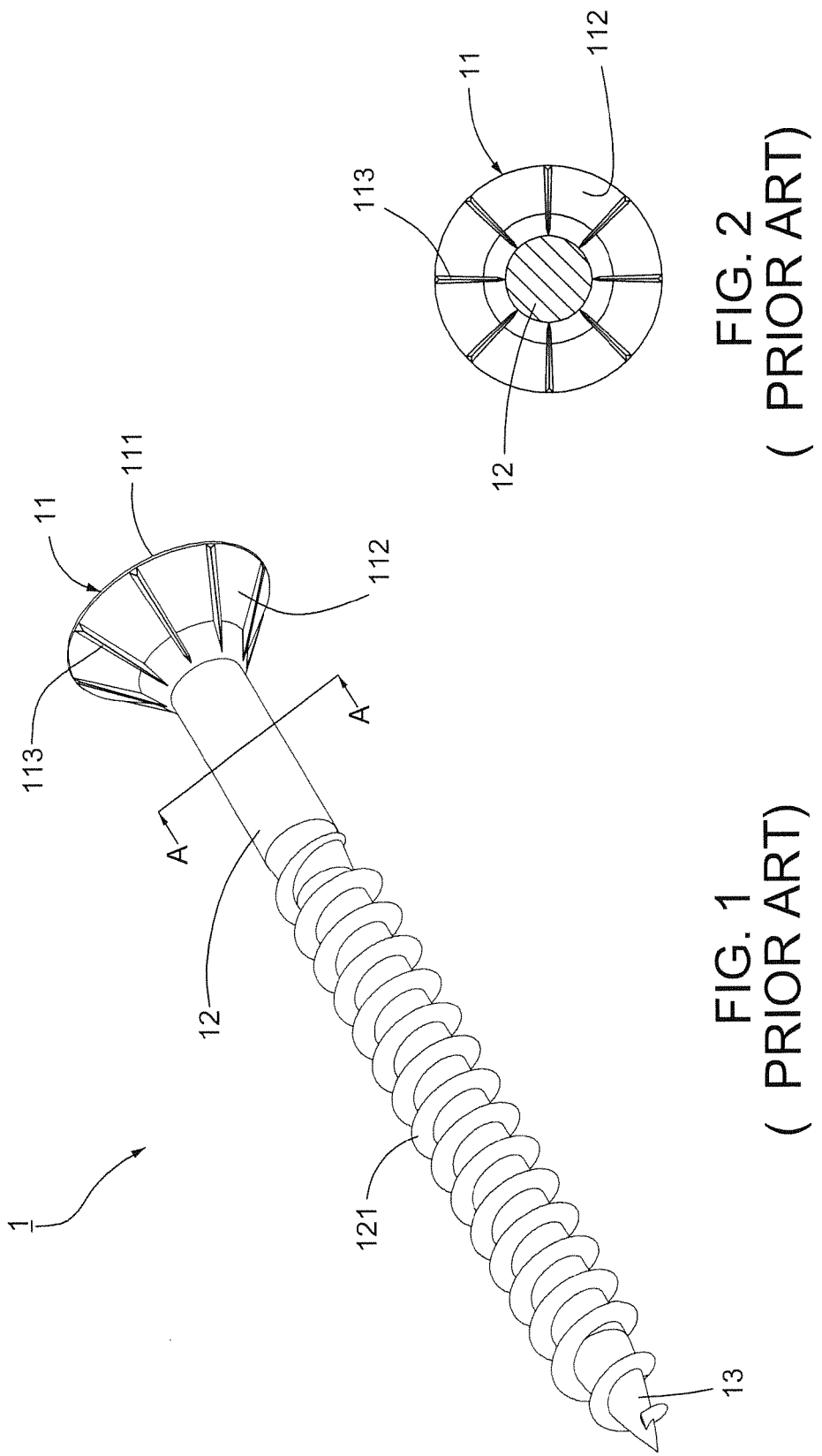

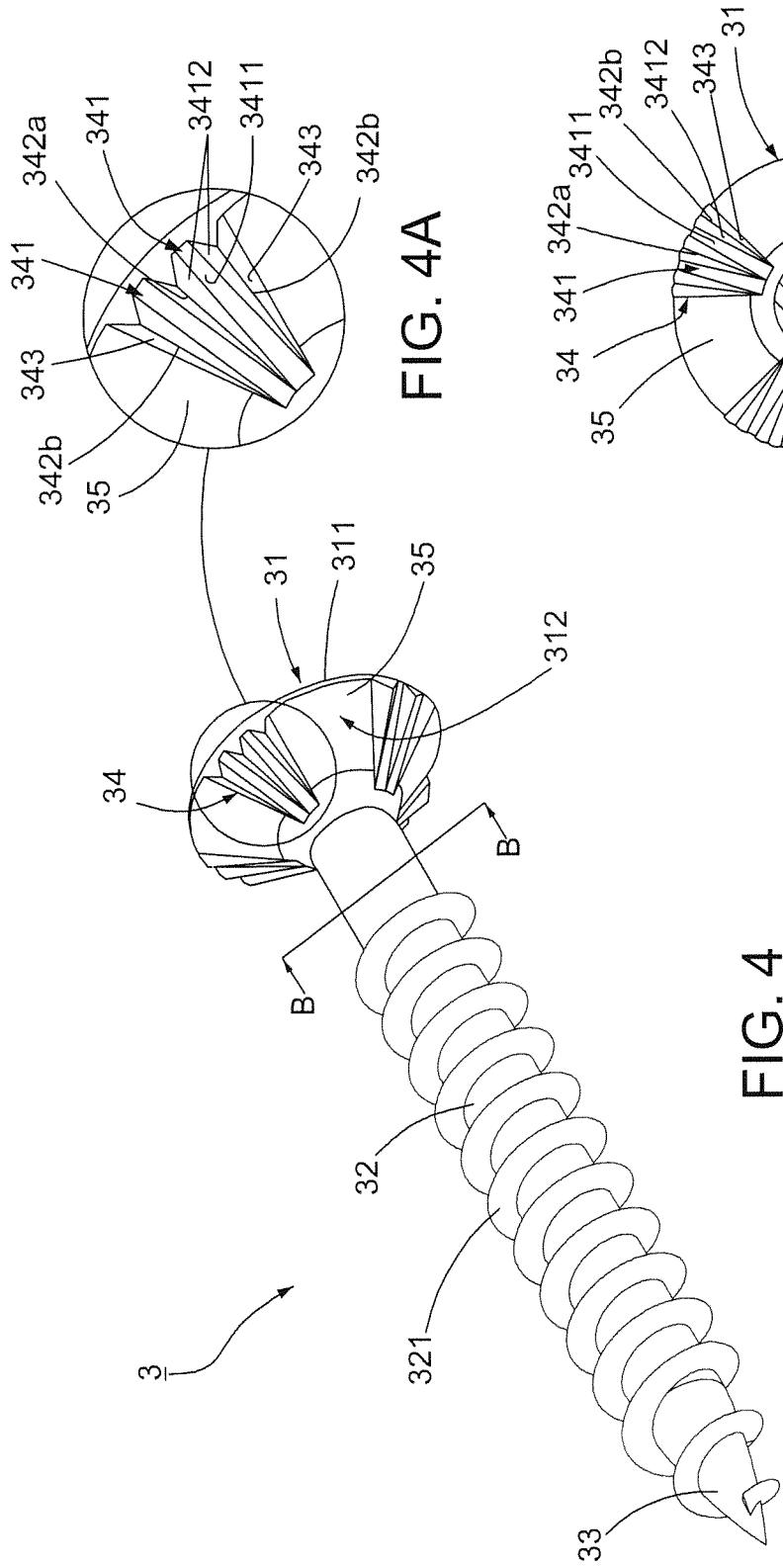
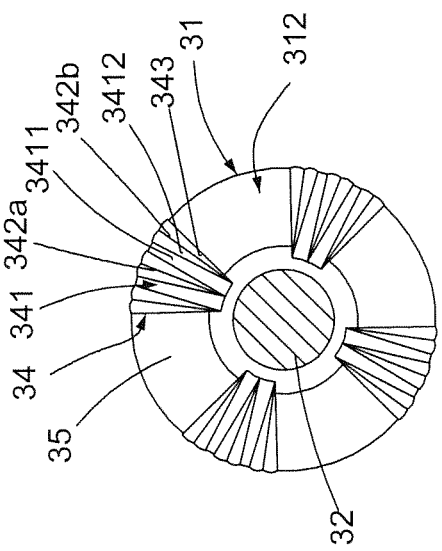
FIG. 4A
FIG. 4
FIG. 5

WOOD SCREW

CROSS-REFERENCE TO RELATED APPLICATION

This invention is a continuation-in-part of the U.S. patent application Ser. No. 13/726,936, filed on 26 Dec. 2012, currently pending, of which the subject matter is incorporated herein by reference in its entirety.

BACKGROUND OF THE INVENTION

1. Field of the Invention

This invention relates to a screw and relates particularly to a wood screw.

2. Description of the Related Art

Referring to FIGS. 1 and 2, a conventional wood screw 1 comprises a head 11, a shank 12 extending from the head 11 and a drilling portion 13 disposed on the shank 12, opposite to the head 11. The shank 12 has a plurality of threads 121 spirally disposed thereon. The head 11 includes a top surface 111, a conical bottom surface 112 extending downwards from the top surface 111 and a plurality of ribs 113 disposed at intervals on the conical bottom surface 112. Referring to FIG. 3, when a user directs the drilling portion 13 at a wooden board 2 and rotates the head 11 to bore a hole 21 in the wooden board 2. Then, the thread 121 keeps drilling the shank 12 into the hole 21 until the head 11 touches the wooden board 2 and the ribs 113 cut wood burrs attached to a peripheral edge of the hole 21. Thus, the drilling operation is completed.

Because the wooden board 2 is formed with resilient wooden fibers, those spaced apart ribs 113 can only lift up the fibrous burrs but cannot cut and scrape off all of the burrs left on the hole 21 effectively. Such burrs incur a protrusion and render the head 11 difficult to be flush with a surface of the board 2. Thus, the fastening effect of the screw 1 cannot go well. Further, the head 11 does not provide a proper space for receiving the burrs cut by the ribs 113. This may stick some burrs out from the head 11 after the screw 1 is screwed into the wooden board 2. Thus, the screw 1 cannot achieve a good fastening effect.

SUMMARY OF THE INVENTION

It is an object of this invention to provide a wood screw which effectively cuts and scrapes off burrs attached to the peripheral edge of the drilled hole, provides a space enough to accommodate the cut burrs and prevent the burrs from sticking out from the head after the screwing action is done, and allows the head to fit level with the surface of the wooden board tightly for achieving a better fastening effect.

The wood screw in accordance with this invention comprises a head, a shank extending from the head, a drilling portion disposed at one end of the shank and a plurality of threads spirally disposed on the shank. The head includes a top surface and a conical bottom surface extending downwards from the top surface. The head further includes a plurality of cutting areas spaced from each other on the conical bottom surface and a smooth area defined between any two adjacent cutting areas. A surface of each smooth area is the same as the conical bottom surface. Each of the cutting areas has at least two grooves, each of which has abase different from the smooth area and two rib walls protruding from the base. The rib walls of two adjacent grooves meet to form a first cutting edge. Each of the cutting areas further has two outer walls, each of which protrudes from the surface of the smooth area. The outer wall and one of the rib walls of the groove which is adjacent to the outer wall meet to form a second cutting edge. Accordingly, wood burrs left on a peripheral edge of a drilled hole are effectively and continuously cut and scraped off by the cutting edges and then accommodated in the grooves. Therefore, the burrs do not stick out from the head after the screwing action is done. The head can be tightly flush with the surface of the wooden board to enhance the fastening effect.

Preferably, the base of the cutting area is in a protruding manner relative to the conical bottom surface so that the cutting areas can protrude from the conical bottom surface radially.

Preferably, a thread-free section can be defined on the shank between the threads and the head to help connect two wooden boards together.

Preferably, a reaming section can be defined on the shank between the threads and the thread-free section. The reaming section has helical units spirally defined between the thread-free section and the threads in order to help scrape off the burrs attached to the inner wall of the board and reduce the drilling resistance. A spiral angle of the helical units inclined with respect to a shank axis is smaller than a spiral angle of the threads inclined with respect to the shank axis.

The advantages of the present invention over the known prior arts are more apparent to those of ordinary skilled in the art upon reading following descriptions in conjunction with the accompanying drawings.

BRIEF DESCRIPTION OF THE DRAWINGS

FIG. 1 is a schematic view showing a conventional wood screw;

FIG. 2 is a cross-sectional view showing the A-A portion of FIG. 1;

FIG. 4 is a perspective view showing a first preferred embodiment of this invention;

FIG. 4A is an enlarged view of FIG. 4;

FIG. 5 is a cross-sectional view showing the B-B portion of FIG. 4;

DETAILED DESCRIPTION OF THE PREFERRED EMBODIMENTS

Figure 3:
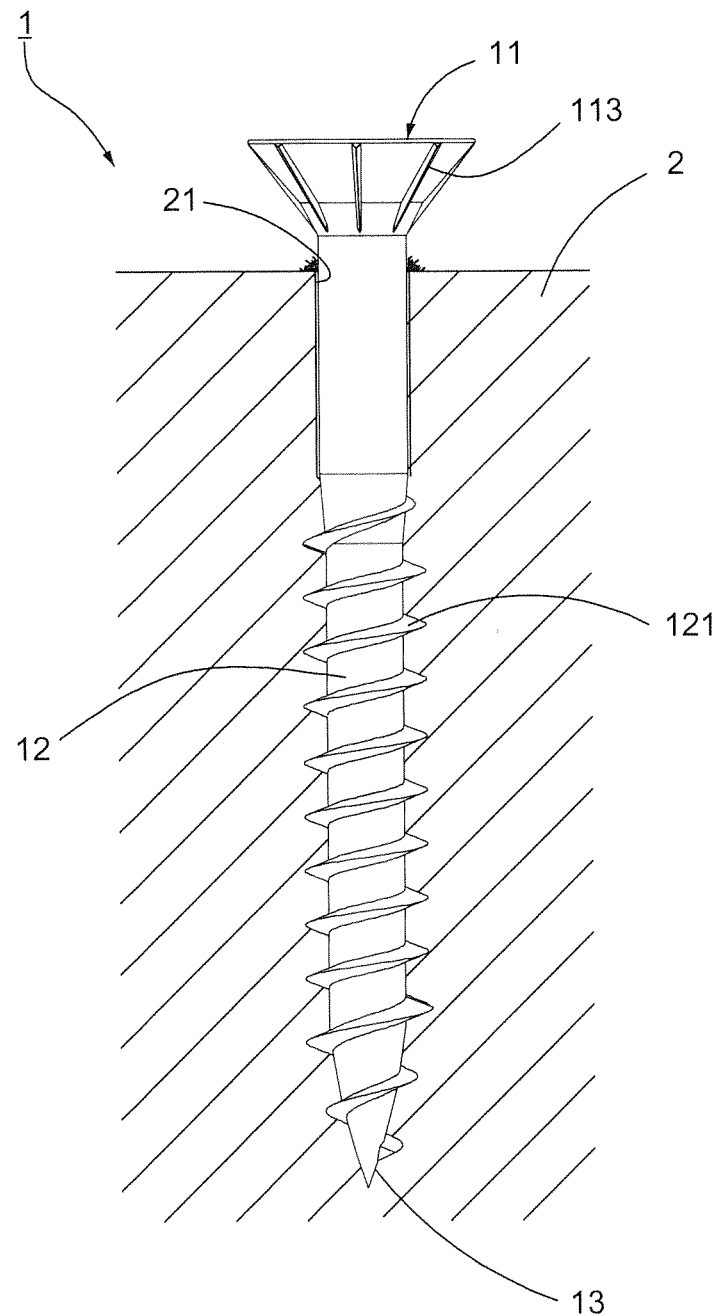
FIG. 3 is a schematic view showing the conventional wood screw in use.

Referring to FIG. 4, FIG. 4A and FIG. 5, a first preferred embodiment of this invention is shown. A wood screw 3 comprises a head 31, a shank 32 extending from the head 31, and a drilling portion 33 disposed at one end of the shank 32, opposite to the head 31. The shank 32 has a plurality of threads 321 spirally disposed thereon. The head 31 includes a top surface 311 and a conical bottom surface 312 extending downwards from the top surface 311. The head 31 further includes a plurality of spaced apart cutting areas 34 radially disposed on the conical bottom surface 312. Between any two adjacent cutting areas 34 is defined a smooth area 35 whose surface is the same as the conical bottom surface 312.

Each of the cutting areas 34 has at least two grooves 341, which can be radially extended to a periphery of the top surface 311 of the head 31. Each of the grooves 341 has a base 3411 and two rib walls 3412 protruding from the base 3411. Herein, the base 3411 is different from the conical bottom surface 312 and preferably protrudes from the conical bottom surface 311. Therefore, the cutting areas 34 can be in a protruding manner to distinguish from the conical bottom surface 312 and the smooth areas 35, thereby facilitating the cutting action. Further, the rib walls 3412 of two adjacent grooves 341 meet to form a first cutting edge 342a. The cutting area 34 also has two outer walls 343, each of which protrudes from or goes upwards from the surface of the smooth area 35. The outer wall 343 and one of the rib walls 3412 of the groove 341 which is adjacent to the outer wall 343 meet to form a second cutting edge 342b. The number of the cutting areas 34 and grooves 341 can be adjusted to satisfy the need. In this embodiment, four spaced apart cutting areas 34 are adopted, and each cutting area 34, as shown, has two cutting grooves 341 to form one first cutting edge 342a and two second cutting edges 342b at two sides of each cutting area 34. With respect to the drilling portion 33, it is preferably designed into a conical shape in this embodiment.

Figure 6:
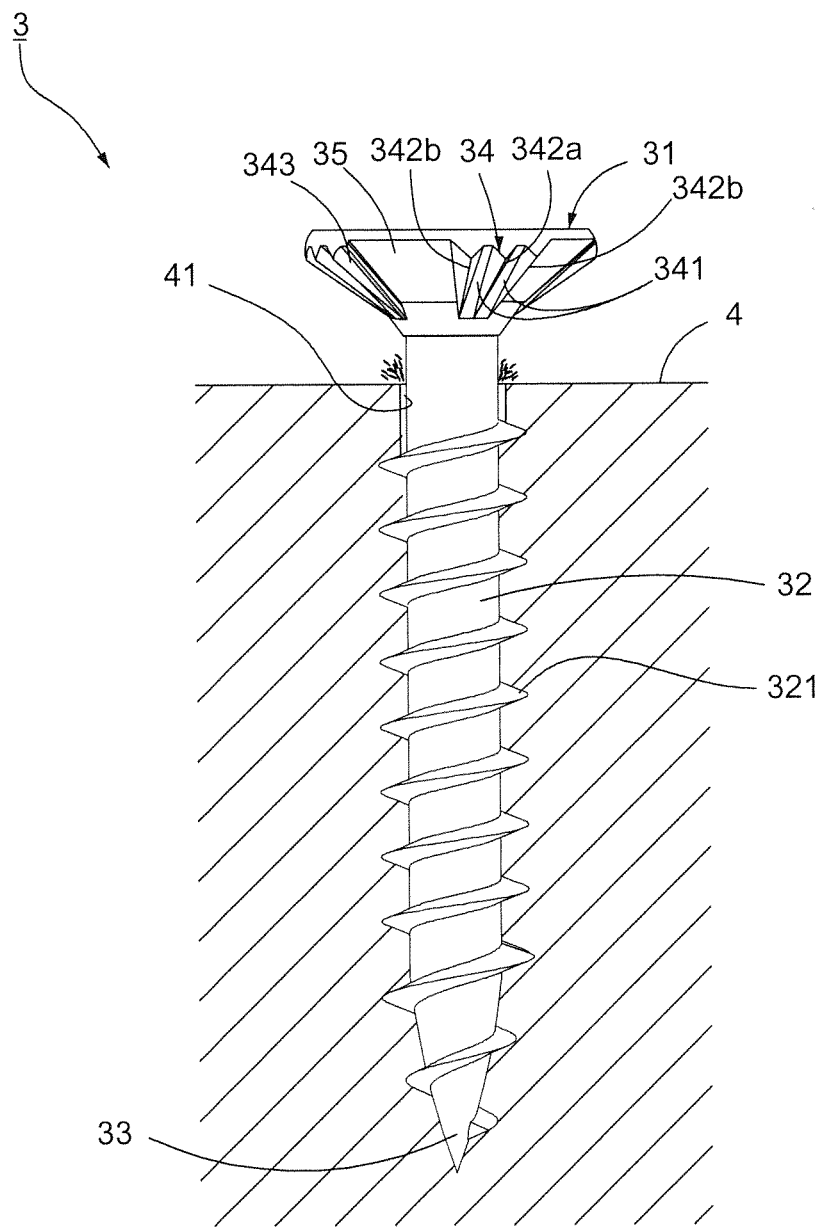
FIG. 6 is a schematic view showing the first preferred embodiment of this invention in use.

Referring to FIG. 4A and FIG. 6, to fasten the wood screw 3 into a wooden board 4, a user puts the drilling portion 33 on a surface of the wooden board 4 and rotates the head 31. The rotation of the head 31 drives the drilling portion 33 and the threads 321 to cut and enter the wooden board 4 and bore a drilled hole 41 in the wooden board 4. Concurrently, wood burrs are generated owing to the cutting action of the drilling portion 33 and the threads 321 and attached to a peripheral edge of the drilled hole 41. The threads 321 and the shank 32 keep drilling into the wooden board 4 along the drilled hole 41. When the head 31 approaches and touches the drilled hole 41, the burrs are tightly pulled and lift up by the outer walls 343 and the rib walls 3412 of each cutting area 34 and sequentially severed and chopped by one second cutting edge 342b, the first cutting edge 342a and the other second cutting edge 342b. In other words, the outer walls 343, the rib walls 3412 and the grooves 341 of each cutting area 34 are combined to function as a serrated structure capable of pulling the burrs tightly and allowing the burrs to be cut under the tension. Therefore, the burrs at the peripheral edge of the drilled hole 41 are efficiently scraped off so that the difficulty in scraping off burrs with fibrous resilience can be easily solved. Further, the burrs scraped off by the cutting edges 342a, 342b are accommodated in the grooves 341 to prevent the burrs from sticking out from the head 31. Without the interference of the burrs, the head 31 can be flush with the surface of the wooden board 4 more tightly to enhance the fastening effect between the wood screw 3 and the wooden board 4.

Figure 7:
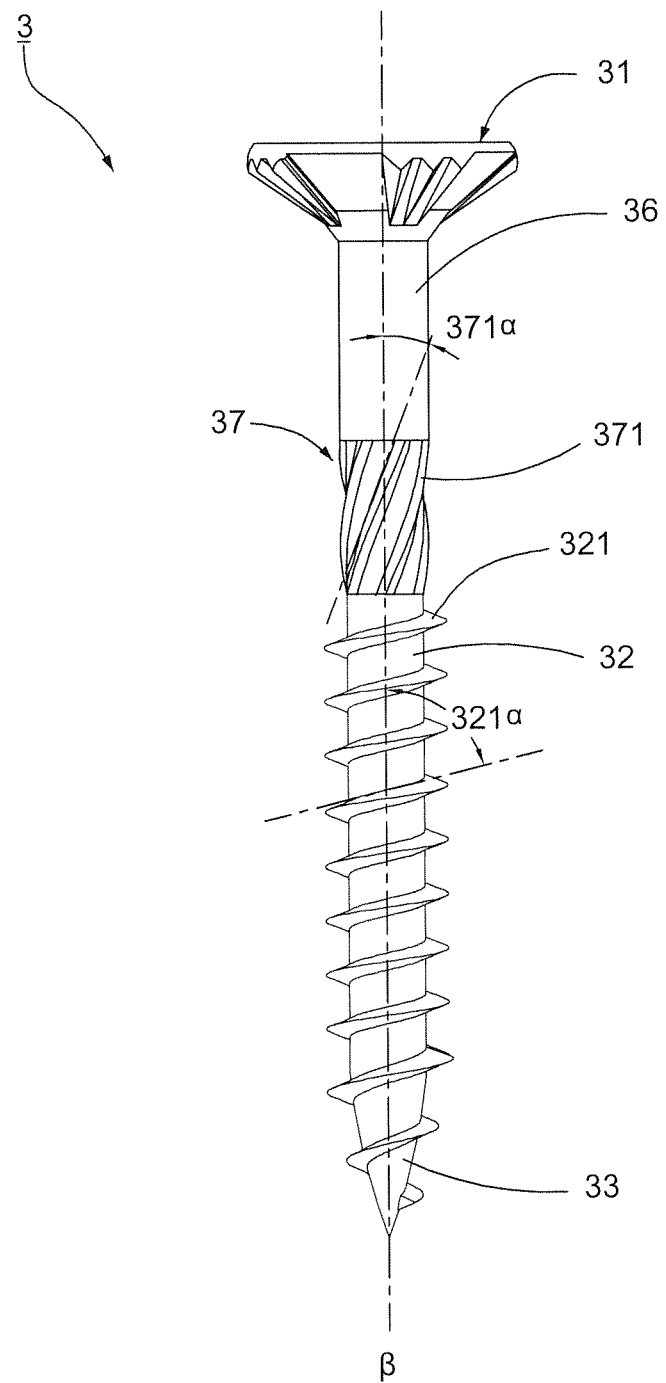
FIG. 7 is a front elevational view showing a second preferred embodiment of this invention.

Referring to FIG. 7, a second preferred embodiment of this invention still comprises a head 31, a shank 32 with threads 321 and a drilling portion 33. The concatenation of other correlated elements, operations and effects of this embodiment are the same as those of the first preferred embodiment and are herein omitted. This embodiment is characterized in that the shank 31 includes a thread-free section 36 located between the head 31 and the threads 321 of the shank 32. Further, a reaming section 37 is disposed between the thread-free section 36 and the threads 321 and provided with a plurality of helical units 371 formed in a spiral manner. Further, a spiral angle 371α of the helical units 371 inclined with respect to an axis β of the shank 32 is smaller than a spiral angle 321α of the threads 321 inclined with respect to the axis β of the shank 32. Accordingly, the helical units 371 can scrape off the burrs attached to an inner wall of the drilled hole of the wooden board, thereby reducing the screwing resistance against the shank 32 at the time of drilling. Further, the thread-free section 36 helps two wooden boards, not shown, connect with each other firmly. Thus, the fastening effect of the wood screw 3 is also increased and promoted.

To sum up, the wood screw scrapes off and cuts burrs attached to the peripheral edge of the drilled hole on the wooden board with the aid of the cutting edges formed by rib walls of the grooves and outer walls of each cutting area. The scraped burrs are also accommodated in the grooves, so the head can sit tightly and fit flush with the surface of the wooden board. Thus, the fastening effect of the screw is promoted.

While the embodiments of this invention are shown and described, it is understood that further variations and modifications may be made without departing from the scope of this invention.

What is claimed is:

1. A wood screw comprising:
a head including a top surface and a bottom surface extending downwards from said top surface;
a shank extending downwards from said bottom surface and having a plurality of threads spirally disposed thereon; and
a drilling portion disposed at one end of said shank, opposite to said head;
wherein said head includes a plurality of spaced apart cutting areas disposed on said bottom surface, a smooth area being formed between any two adjacent cutting areas and forming a conical shape on said bottom surface, each of the plurality of said cutting areas having at least two radially extending grooves, each of said at least two grooves having a base formed separate from said conical shape formed by said smooth conical areas, two rib walls protruding from each of said bases, each base of each cutting area protruding from said shape formed by said smooth conical areas, said rib walls of two adjacent grooves meeting to form a first cutting edge, each of the plurality of said cutting areas having two outer walls, each of said two outer walls being adjacent to and protruding from said smooth conical area, each of said outer wall and one of said rib walls of each groove which is adjacent to each outer wall meeting to form a second cutting edge.

2. The wood screw as claimed in claim 1, wherein said shank includes a thread-free section formed between said head and said threads.

3. The wood screw as claimed in claim 2, wherein said shank includes a reaming section with helical units spirally disposed between said thread-free section and said threads, a spiral angle of said helical units inclined with respect to an axis of said shank being smaller than a spiral angle of said threads inclined with respect to said axis of said shank.

* * * * *